(12) United States Patent
Chen et al.

(10) Patent No.: US 7,486,619 B2
(45) Date of Patent: Feb. 3, 2009

(54) MULTIDIMENSIONAL SWITCH NETWORK

(75) Inventors: Dong Chen, Croton On Hudson, NY (US); Alan G. Gara, Mount Kisco, NY (US); Mark E. Giampapa, Irvington, NY (US); Philip Heidelberger, Cortlandt Manor, NY (US); Dirk Hoenicke, Ossining, NY (US); Burkhard D. Steinmacher-Burow, Mount Kisco, NY (US); Pavlos M. Vranas, Bedford Hills, NY (US); Matthias Augustin Blumrich, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 10/793,068

(22) Filed: Mar. 4, 2004

(65) Prior Publication Data

US 2005/0195808 A1    Sep. 8, 2005

(51) Int. Cl.
*H04L 12/28* (2006.01)
(52) U.S. Cl. ...................... 370/235; 370/238
(58) Field of Classification Search ......... 370/235–238, 370/238.1, 389, 390, 392, 395.1, 396, 395.21, 370/395.31, 411, 431, 432, 474, 475, 476
See application file for complete search history.

(56) References Cited

U.S. PATENT DOCUMENTS

| | | | | |
|---|---|---|---|---|
| 5,224,100 | A * | 6/1993 | Lee et al. ..................... | 370/408 |
| 5,970,232 | A * | 10/1999 | Passint et al. ............... | 709/238 |
| 6,044,080 | A * | 3/2000 | Antonov ..................... | 370/401 |
| 6,101,181 | A * | 8/2000 | Passint et al. ............... | 370/352 |
| 6,370,584 | B1 * | 4/2002 | Bestavros et al. ........... | 709/238 |
| 6,718,428 | B2 * | 4/2004 | Lee et al. ..................... | 711/101 |
| 6,779,039 | B1 * | 8/2004 | Bommareddy et al. ...... | 709/238 |
| 6,973,559 | B1 * | 12/2005 | Deneroff et al. ............. | 712/12 |
| 7,000,033 | B2 * | 2/2006 | Lee ............................. | 709/249 |
| 7,027,413 | B2 * | 4/2006 | Lee et al. ..................... | 370/255 |

(Continued)

OTHER PUBLICATIONS

Guido Appenzeller & Methew Holliman, Can Google Route? Building high-Speed Switch from Commodity Hardware, Q2, 2003, 20 pages.*

(Continued)

*Primary Examiner*—Wing F. Chan
*Assistant Examiner*—Mark A. Mais
(74) *Attorney, Agent, or Firm*—Scully, Scott, Murphy & Presser, P.C.; Daniel P. Morris, Esq.

(57) ABSTRACT

Multidimensional switch data networks are disclosed, such as are used by a distributed-memory parallel computer, as applied for example to computations in the field of life sciences. A distributed memory parallel computing system comprises a number of parallel compute nodes and a message passing data network connecting the compute nodes together. The data network connecting the compute nodes comprises a multidimensional switch data network of compute nodes having N dimensions, and a number/array of compute nodes Ln in each of the N dimensions. Each compute node includes an N port routing element having a port for each of the N dimensions. Each compute node of an array of Ln compute nodes in each of the N dimensions connects through a port of its routing element to an Ln port crossbar switch having Ln ports. Several embodiments are disclosed of a 4 dimensional computing system having 65,536 compute nodes.

1 Claim, 16 Drawing Sheets

U.S. PATENT DOCUMENTS

2002/0147841 A1* 10/2002 Lee .......................... 709/241
2003/0058850 A1* 3/2003 Rangarajan et al. ......... 370/389
2003/0067925 A1* 4/2003 Choe et al. .................. 370/400

OTHER PUBLICATIONS

The Click Modular Router project, www.read.cs.ucla.edu/click/.*
Eddie Kohler et al., The Click Modular Router, Labaratory fpr Computer Science, MIT, pp. 1-34.*
Pradhan et al., Implementation and Evaluation of a QOS-Capable Cluster-based IP Router, IEEE Nov. 16, 2002, pp. 1-13.*
Aamodt, Tore Anders, Design and implementation issues for an SCI cluster configuration system, SCI Europe, Sep. 28, 1998, pp. 1-7.*
Kohler et al., The Click Modular Router, submitted to the Departmnet of Electrical Engineering and Computer Science, 2000, MIT, pp. 1-127.*
Chen et al., Flexible Control of parallelism in a multiprocessor PC Router, Labortatory for Computer Science MIT, pp. 1-14.*
The Click Modular Router project (c.1999), www.read.cs.ucla.edu/click/.*
Eddie Kohler et al., The Click Modular Router (Nov. 2000), Labaratory for Computer Science, MIT, pp. 1-34.*
Chen et al., Flexible Control of parallelism in a multiprocessor PC Router (Jun. 2001), Labortatory for Computer Science MIT, pp. 1-14.*

* cited by examiner

A TWO-DIMENSIONAL SWITCHED NETWORK

BUILDING BLOCKS OF A 4-D SWITCH NETWORK

NODE CARD, WITH 16 COMPUTE NODES, 1 SWITCH

SWITCH CARD, WITH 16 SWITCHES

COMPUTE MIDPLANE

COMPUTE RACK

64K COMPUTE NODE SYSTEM

SWITCH MIDPLANE

SWITCH RACK

64K COMPUTE NODE SYSTEM WITH SWITCH RACKS

PARTITIONING AND FAULT TOLERANCE

COLLECTIVE OPERATIONS

1-DIMENSIONAL MAPPING OF NODES OVER A 2-D SWITCH NETWORK

US 7,486,619 B2

MULTIDIMENSIONAL SWITCH NETWORK

BACKGROUND OF THE INVENTION

1. Field of the Invention

The present invention relates generally to multidimensional switch networks, and more particularly pertains to multidimensional message-passing switch data networks as are used by a distributed-memory parallel computer, as applied for example to computations in the field of life sciences.

The multidimensional switch network also has utility outside a multi-node parallel computer, and for example could serve as a many-ported router for Ethernet or other general-purpose networking.

2. Discussion of the Prior Art

A distributed-memory parallel computing system usually consists of a number of computing nodes, plus a message-passing data network that connects the computing nodes together. Two types of message-passing data networks are most commonly in use in the art:

(1) A multistage fat tree switch network, where each computing node connects to a port of the data switch. Within the switch network, different stages are cross-connected in a fat tree fashion. The cross-section network bandwidth is usually maintained across stages. This network offers a flat view for the computing nodes. Each node has equal distance and therefore communication bandwidth to any other node. However, as the number of the computing nodes grows, the switch network itself becomes increasingly complex and costly, limiting the overall scalability of the total system. Most of the largest parallel super-computing systems in existence today use this type of network, and seldom exceed a few thousand computing nodes.

(2) A multidimensional torus or mesh network where each node only directly connects to a few neighboring nodes. Network data traffic are routed through the nodes on the way to their destination. These kind of networks are highly scalable, and they maintain nearest neighbor network bandwidth through different machine sizes. However, network bandwidth reduces inversely as the number of average network hops a message has to travel, and becomes the limiting factor when application performance depends on all-to-all type communications.

SUMMARY OF THE INVENTION

Accordingly, it is a primary object of the present invention to provide multidimensional switch message-passing data networks as are used by a distributed-memory parallel computer, as applied for example to computations in the field of life sciences. A distributed memory parallel computing system comprises a number of parallel compute nodes and a message passing data network connecting the compute nodes together. The data network connecting the compute nodes comprises a multidimensional switch data network of compute nodes having N dimensions, and a number/array of compute nodes Ln in each of the N dimensions. Each compute node includes an N port routing element having a port for each of the N dimensions. Each compute node of an array of Ln compute nodes in each of the N dimensions connects through a port of its routing element to an Ln port crossbar switch having Ln ports. Several embodiments are disclosed of a 4 dimensional computing system having 65,536 compute nodes.

The present invention provides multiple switch dimensions, wherein N= or >2, and the interconnection of the switches by the nodes. In the case N=1, the one-dimensional switch network is largely the same as existing full-crossbar switches.

BRIEF DESCRIPTION OF THE DRAWINGS

The foregoing objects and advantages of the present invention for a multidimensional switch network may be more readily understood by one skilled in the art with reference being had to the following detailed description of several embodiments thereof, taken in conjunction with the accompanying drawings wherein like elements are designated by identical reference numerals throughout the several views, and in which:

FIGS. 3 through 7 illustrate an exemplary construction of a 65,536 computing node system.

FIG. 4 illustrates a compute mid-plane or back-plane having the compute node cards and switch cards of FIG. 3 plugged therein to form the compute mid-plane or back-plane.

FIG. 5 illustrates a compute rack which includes four compute mid-planes, such as illustrated in FIG. 4, fitted into the a compute rack which contains a total of 1024 compute nodes.

FIG. 6 illustrates the cabling for the embodiment using local in-rack switches for the z- and t-dimensions as shown in FIG. 4.

FIG. 7 illustrates one embodiment of a 65,536 compute node system consisting of 64 compute racks.

FIG. 8 illustrates a switch mid-plane or back-plane having 16 of the switch cards of FIG. 3b plugged in for a total of 256 switches.

FIG. 9 illustrates a switch rack which includes four switch mid-planes, such as illustrated in FIG. 8, fitted into the a rack which contains a total of 1024 switches.

FIG. 10 illustrates the cabling between compute rack mid-planes and switch rack mid-planes for the embodiment where the optional switches for Z and T directions in FIG. 4 are not populated, and instead separate switch racks as in FIG. 9 are used for Z and T dimension switches.

FIG. 11 illustrates the alternative embodiment of a 65,536 compute node system consisting of 64 compute racks and 16 switch racks.

DETAILED DESCRIPTION OF THE INVENTION

Figure 1:
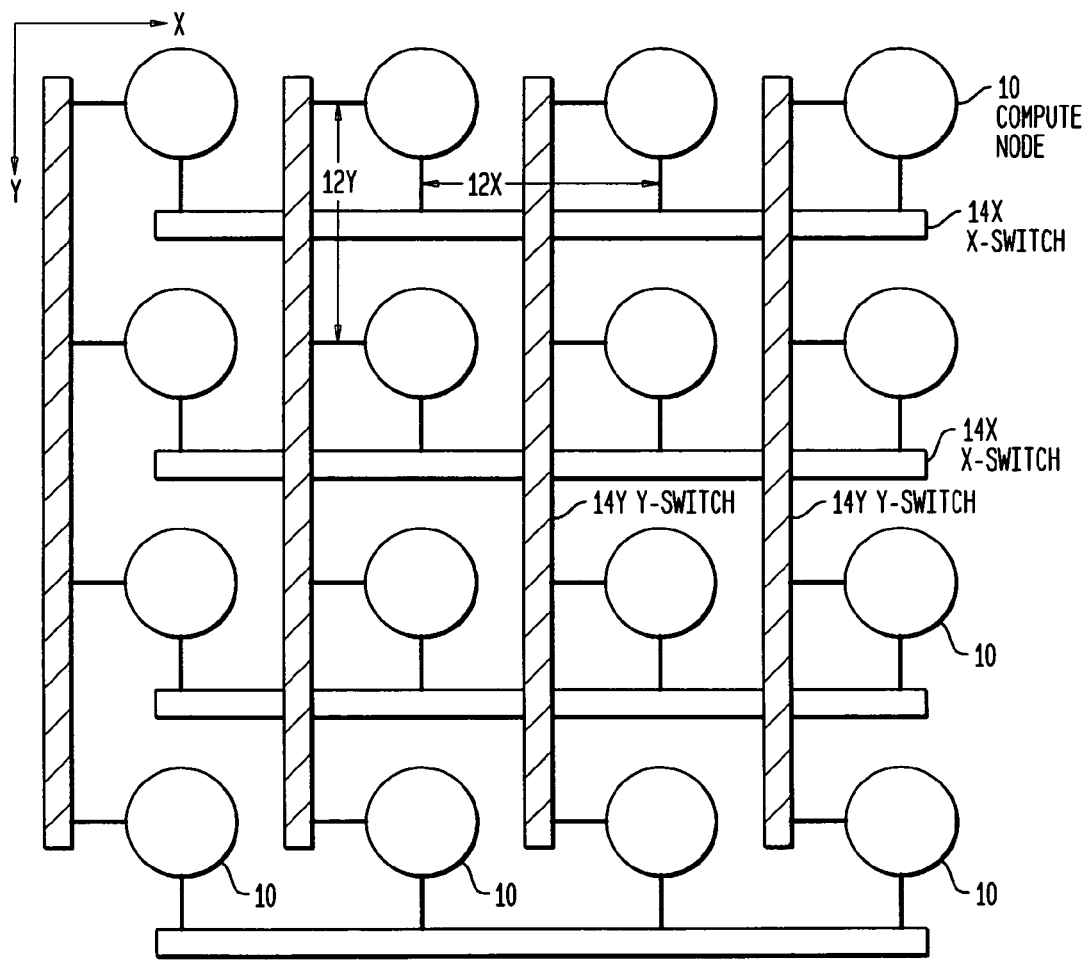
FIG. 1 illustrates an exemplary embodiment of a 2-D (2 dimensional) switch network pursuant to the present invention having 4^2=16 computing nodes.

1. 2-Dimensional Example:

FIG. 1 illustrates an exemplary embodiment of a 2-D (2 dimensional) switch network pursuant to the present invention having 4^2=16 compute nodes 10. Each compute node has 2 network ports, an X port 12X and a Y port 12Y. The 16 nodes form a 4×4 array of nodes, with 2-D coordinate (X,Y). All 4 compute nodes 10 of the same Y coordinates connect through the X port to an X full crossbar switch 14X, and all 4 compute nodes 10 of the same X coordinate connect through the Y port to a Y full crossbar switch 14Y. The routing functions are provided through the 8 (4 in the X-direction and 4 in the Y-direction) X and Y crossbar switches and through each node over the X, Y ports.

A message passes over the network as follows. The source node is node (sx,sy). The destination node is node (dx,dy). If the source node and the destination node have the same y-index, i.e. sy=dy, but differ in the x-index, i.e. sx/=dx, then the source node passes the message to its x-switch which passes the message to the destination node. Or if the source and destination have the same x-index, i.e. sx=dx, but differ in the y-index, i.e. sy/=dy, then the source node passes the message to its y-switch which passes the message to the destination node. Or if the source and destination differ in the x-index, i.e. sx/=dx, and differ in the y-index, i.e. sy/=dy, then the source node passes the message to either its x-switch or its y-switch. If passed to the x-switch of the source node, the x-switch passes the message to the intermediate node with the destination x-index, i.e. node (dx,sy). The intermediate node is then the effective source of the message and the message can be forwarded as described above when only the y-dimension differs between source and destination. In other words, the intermediate node (dx,sy) will place the message onto its y-switch which can deliver the message to the destination node. Alternatively, the original source node (sx,sy) passes the message to its y-switch, which passes the message to the intermediate node with the destination y-index, i.e. node (sx, dy). This intermediate node is then the effective source of the message and the message can be forwarded as described above when only the x-dimension differs between source and destination. In other words, the intermediate node (sx,dy) will place the message onto its x-switch which can deliver the message to the destination node.

As described in the above examples, the message passing can be minimal path message passing. In other words, a message takes the minimal number of node-switch and switch-node hops between the source node and the destination node. This means that a message passes over exactly one switch in each dimension in which the source node and the destination node differ. A message passes over no switches in any dimension in which the source and destination nodes are the same. As described in the above examples, when the source and destination nodes differ in more than one dimension, the exact path depends on the order in which the dimensions are satisfied. This is called dynamic routing.

When the source and destination nodes differ in more than one dimension, the exact path depends on the order in which the dimensions are satisfied, and this allows adaptive routing, in which the dynamic dimension order choice adapts to network conditions, for example to minimize network congestion.

The switch network is deadlock free if one follows dimensional ordered routing, i.e., packets are routed in a predetermined (X, Y, for example) order. Additional dynamic virtual channels could be added to improve network throughput in congested network situations.

2. 4-Dimensional Example:

The 2-D switch network of the previous section can be generalized to N dimensions. (1) Each compute node 10 has an N-port routing element, label them 1, 2, . . . , N. (2) There are Ln nodes in each N dimension, wherein Ln can be the same or different for each of the N dimensions, and each array of Ln nodes connects to an Ln port crossbar switch 14. For simplicity, consider Ln to be the same L for each of the N dimensions. There is a total of L^N nodes 10, and N*L^(N−1) crossbar switches 14. More generally, the number of nodes in each dimension could differ.

For illustration purposes, consider N=4 and L=16. The 4-D system has a total of 16^4=16×16×16×16=65536=64K nodes. The switch network has 4*64K/16=16384=16K switches. The network preferably uses 4-D hardware address routing, with no internal routing tables necessary at each node and switch, as desired for such a large number of nodes.

Figure 2A:
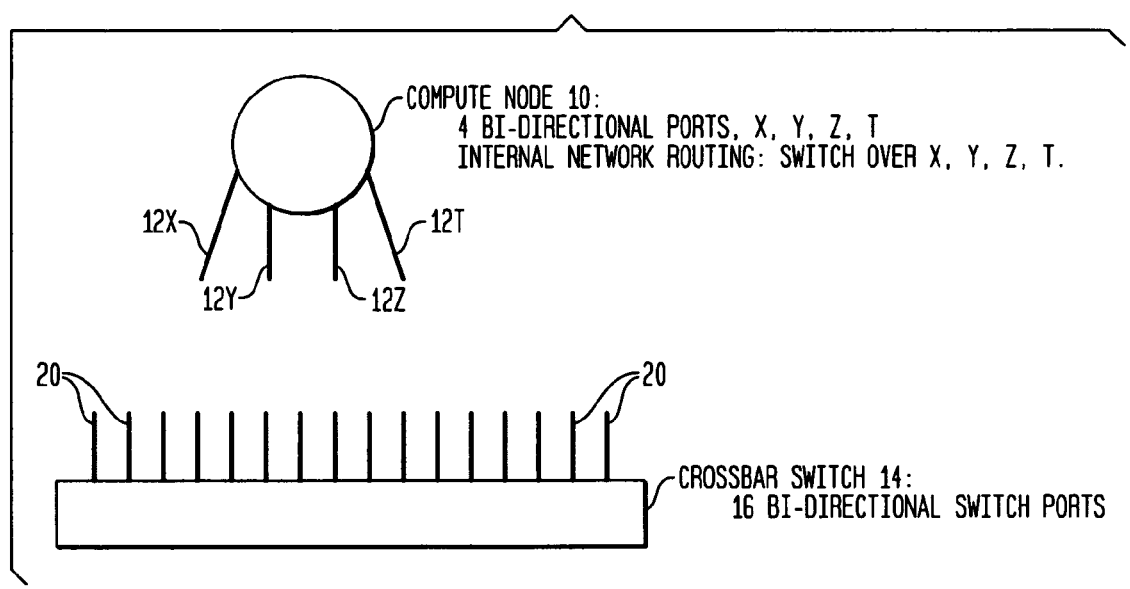
FIG. 2(a) illustrates each compute node having a 4 port routing element, one bi-directional port for each of N=4 dimensions (X, Y, Z, T), with internal network routing over the 4 dimensions (ports), and each switch has 16 bi-directional ports, one port for each node in each dimension.

FIG. 2a illustrates the building blocks, compute node 10 and crossbar switch 14, for constructing the 65536 node system. Each compute node 10 has 4 bi-directional network ports, one for each of the N=4 dimensions (12X, 12Y, 12Z, 12T). An internal network routing element routes data over the 4 network ports. Each switch 14 has 16 bi-directional ports 20, one port for each node in that dimension. In one embodiment, as illustrated in FIGS. 3 to 7 below, each node can be an Application-Specific Integrated Circuit (ASIC) chip, and each switch can be another ASIC chip.

Figure 2B:
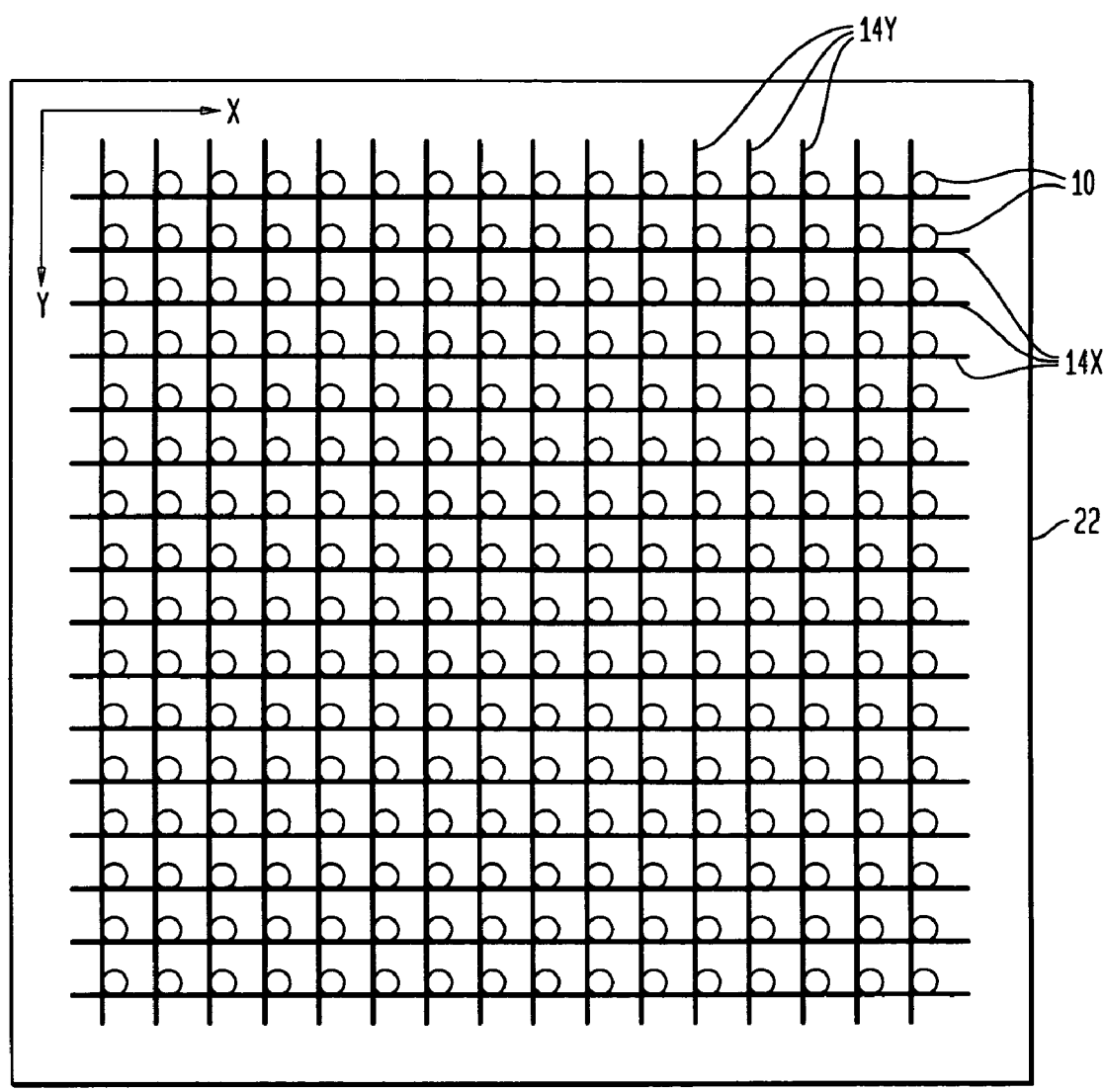
FIG. 2(b) illustrates 256 compute nodes as logically connected by 16 switches in the x-dimension and 16 switches in the y-dimension.

The logical interconnection of the 64K nodes and 16K switches is as follows. FIG. 2b illustrates a group 22 of 256 nodes 10 connected by 16 x-switches 14X and 16 y-switches 14Y.

Figure 2C:
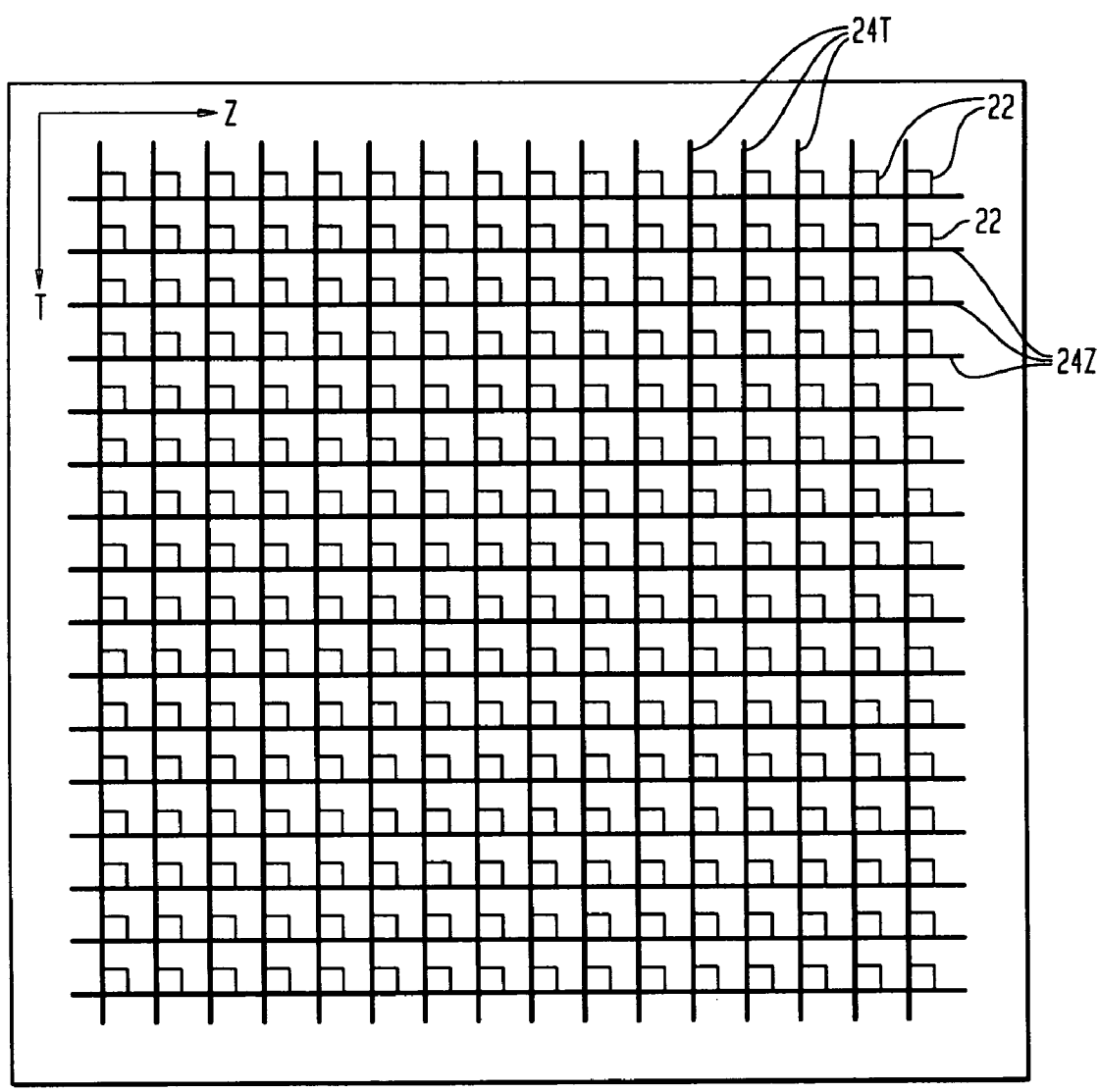
FIG. 2(c) illustrates 65536 compute nodes in 256 groups of 256 nodes connected by 16 groups of 256 z-switches and 16 groups of 256 t-switches.

FIG. 2c illustrates 256 groups of node groups 22, each group with 256 nodes 10 as shown in FIG. 2b. The node groups 22 are connected by 16 groups of z-switches 24Z, each group with 256 z-switches. The node groups 22 are also connected by 16 groups of t-switches 24T, each group with 256 t-switches.

As a further explanation, the nodes attached to any given switch have the same coordinate in the other 3 dimensions. For example, all nodes attached to an x-switch have the same (Y, Z, T) coordinate, and all nodes attached to a y-switch have the same (X, Z, T) coordinate, etc.

The message passing over the 2-D network described in the previous section is generalized to N dimensions here. The indices of the source node and the destination node differ in one or more dimensions designated herein as being non-satisfied dimensions. The indices in the other dimensions are the same, and are designated herein as being satisfied dimensions, since the message does not have to travel in those dimensions. The source node sends the message to one of its switches in a non-satisfied dimension. That switch forwards the message to the intermediate node satisfying that dimension. That intermediate node then sends the message to one of its switches in a remaining non-satisfied dimension. This forwarding across a switch and a node is repeated until the message reaches its destination node. In other words, until all dimensions are satisfied. As in the 2-D example, the message passing is minimal path and can be either dimensional ordered or dynamic and adaptive.

FIGS. 3 through 7 illustrate an exemplary construction of a 65,536 compute node system.

Figure 3A:
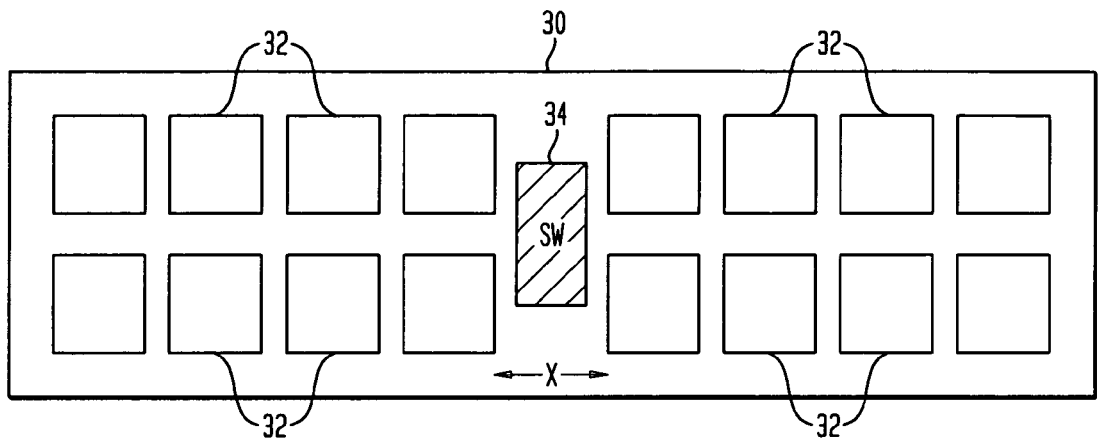
FIG. 3(a) illustrates a compute node card which is a circuit card containing 16 compute chips at 16 compute nodes and 1 switch chip.

FIG. 3(a) illustrates a compute node card 30 which is a circuit card containing 16 compute chips 32 at 16 compute nodes 10 and 1 switch chip 34 at switch 14. The switch chip connects the x-dimension of the nodes, which can be considered to be the dimension extending along the length of the node compute card 30.

Figure 3B:
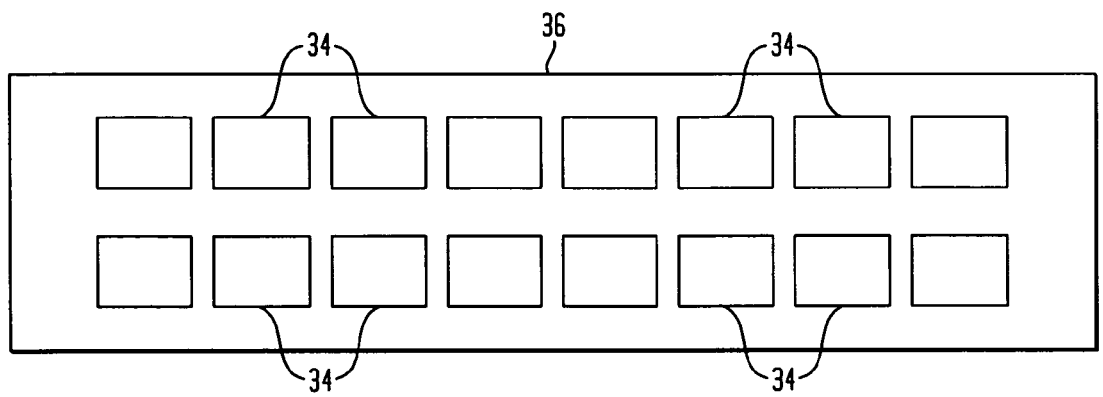
FIG. 3(b) illustrates a switch card which is a circuit card containing 16 switch chips.

FIG. 3(b) illustrates a switch card 36 which is a circuit card containing 16 switch chips 34. The number of switch chips on a switch card and thus the number of switch cards can be chosen for convenience, since the switches are not directly connected. Each switch chip on a switch card serves only one of the y-, z- or t-dimension.

Figure 4:
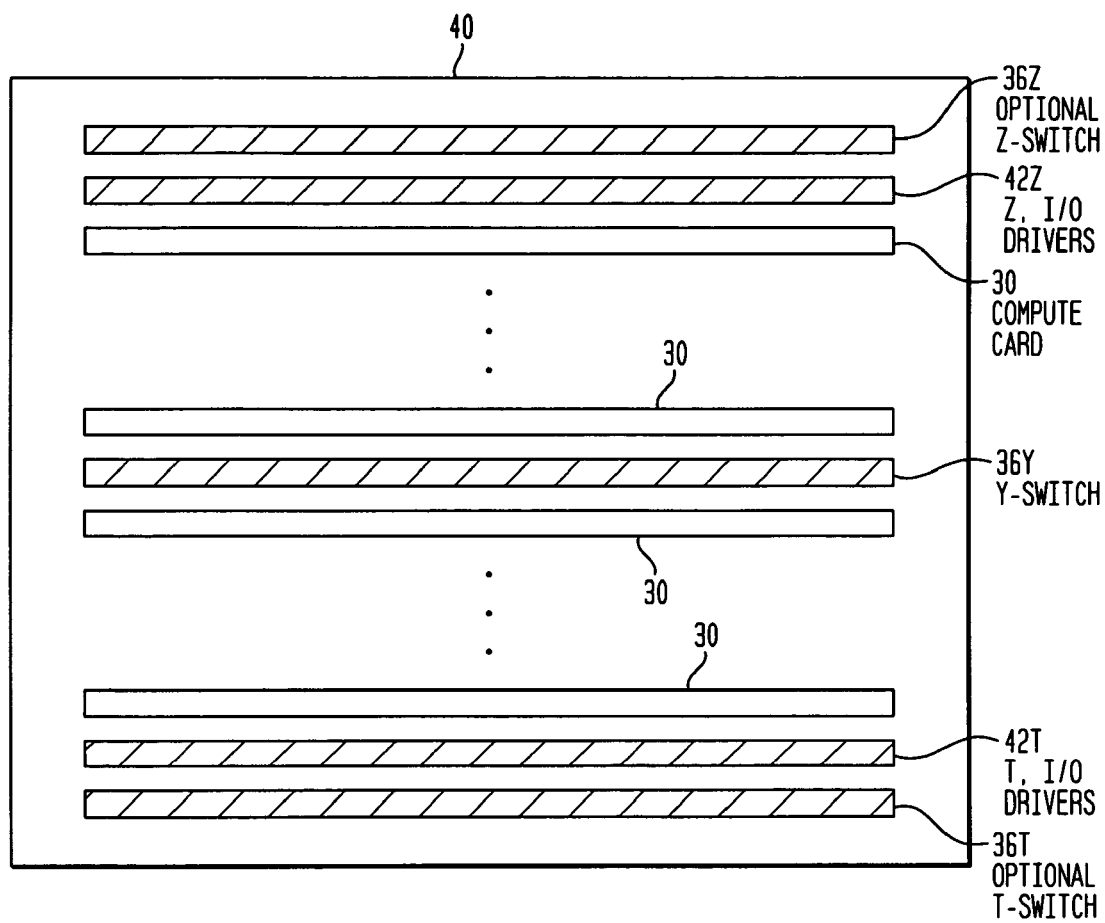

FIG. 4 illustrates a compute mid-plane or back-plane 40 having the compute node cards 30 and switch cards 36 of FIG. 3 plugged therein to form the compute mid-plane or backplane 40. The compute mid-plane (back-plane) has 16 compute node cards 30 (x-switch included), each having 16 compute nodes for a total of 256 compute nodes. FIG. 4 illustrates 4 node compute cards 30, with the others being indicated by vertical dots, 1 centrally located local Y-switch card 36Y, 1 populated z switch card 36Z, 1 populated t switch card 36T, and 2 slots for z and t I/O drivers 42.

The signals between a compute node card 30 and a switch card 36 may travel through the mid-plane to the centrally located y-switch card 36Y. The z- and t-signals from most nodes go to a different mid-plane and thus typically travel through electrical cables or optical fibers. The signals could go onto cables at the node card or at an I/O driver card 42 as illustrated in FIG. 4.

Figure 5:
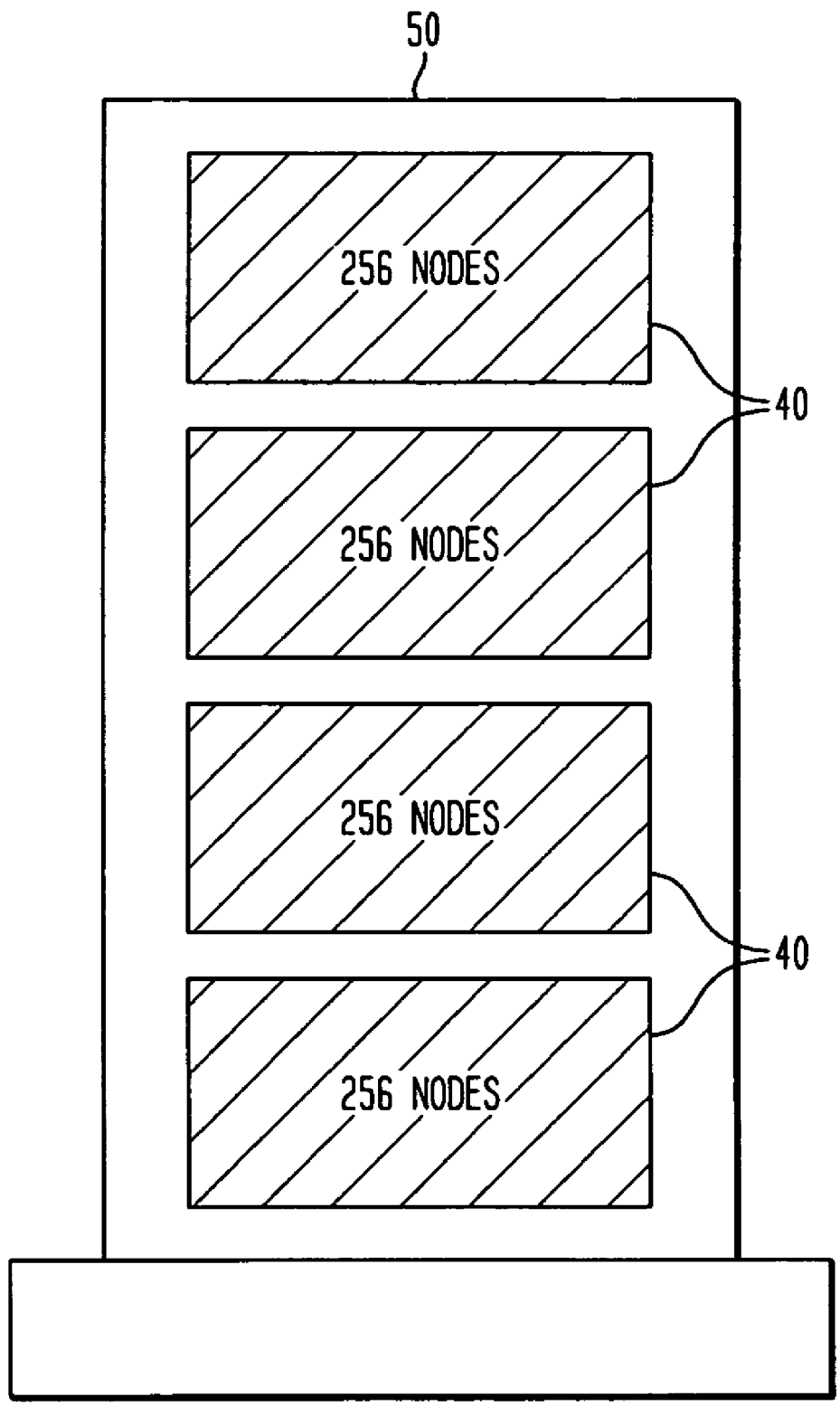

FIG. 5 illustrates a compute rack 50 which includes four compute mid-planes 40, such as illustrated in FIG. 4. Each compute rack contains 1024 compute nodes. The cable or fiber connections between mid-planes simplifies construction of such a rack. No inter-connection is provided between the compute mid-planes other than by the Z and T I/O driver cards 42, and switch cards 36, as shown in the embodiment of FIG. 4. Smaller or larger compute racks with a lesser or greater number of mid-planes are possible in alternative embodiments.

Figure 6:
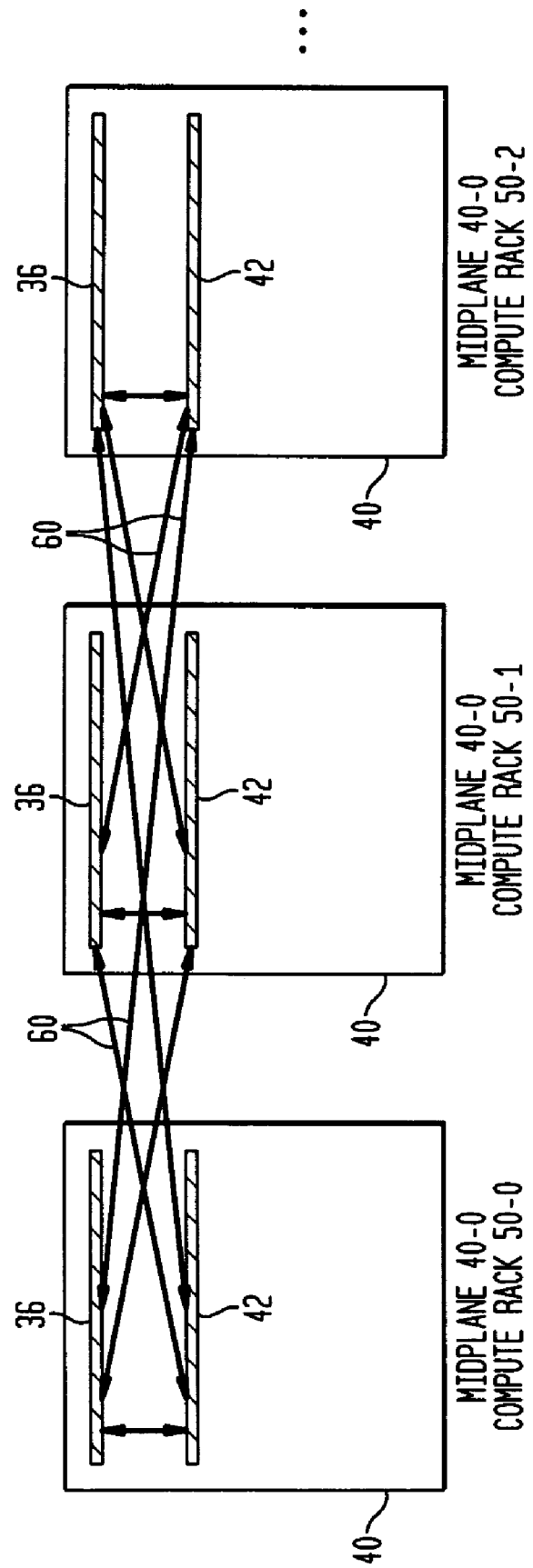

FIG. 6 illustrates the cabling for the embodiment using in-rack switch cards 36Z, 36T for the z- and t-dimensions as shown in FIG. 4. Each compute mid-plane has 256 nodes, therefore 256 z-dimension ports from compute nodes. A z-switch card 36Z has 16 switch chips, each chip has 16 network ports for a total of 256 ports from switch chips. Within the mid-plane, the 256 compute nodes already have their x-, y-dimension ports connected in a 16×16 2-dimensional switch network. Therefore, all of the 256 z-dimension ports on one mid-plane need to be connected to the ports from 15 other mid-planes via the corresponding z-switch cards to form a complete z-dimension. FIG. 6 shows cables 60 from the z-dimension I/O driver 42 of mid-plane 0 of compute rack 50-0, cross connected to 16 z-dimension switch cards 36 on the 16 mid-planes. Each cable 60 represent a bundle of 16 interconnects, one for each pair of z-dimension ports (compute node and switch). The I/O drivers 42 on the remaining mid-planes are similarly connected. The t-dimensional I/O drivers 42 and switch cards 36 are then connected in similar fashion.

Figure 7:
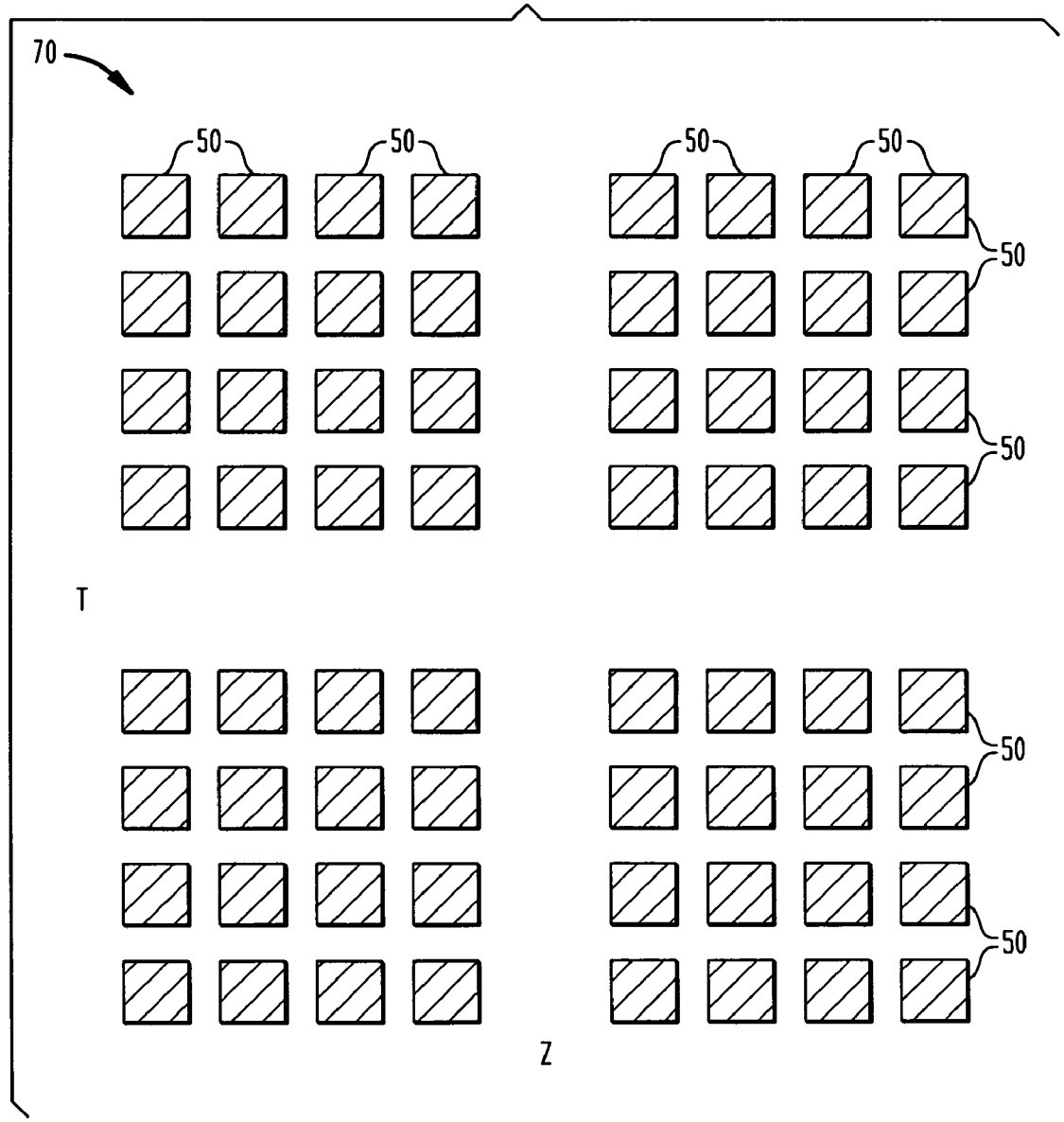

FIG. 7 illustrates the 65,536 (64K) compute node system 70 consisting of 64 compute racks 50. The cabling across racks is as described above with respect to and illustrated in FIG. 6.

3. Alternative 4-Dimensional Construction:

FIGS. 8 to 11 illustrates an alternative embodiment of the 4-dimension 64K node system.

Figure 8:
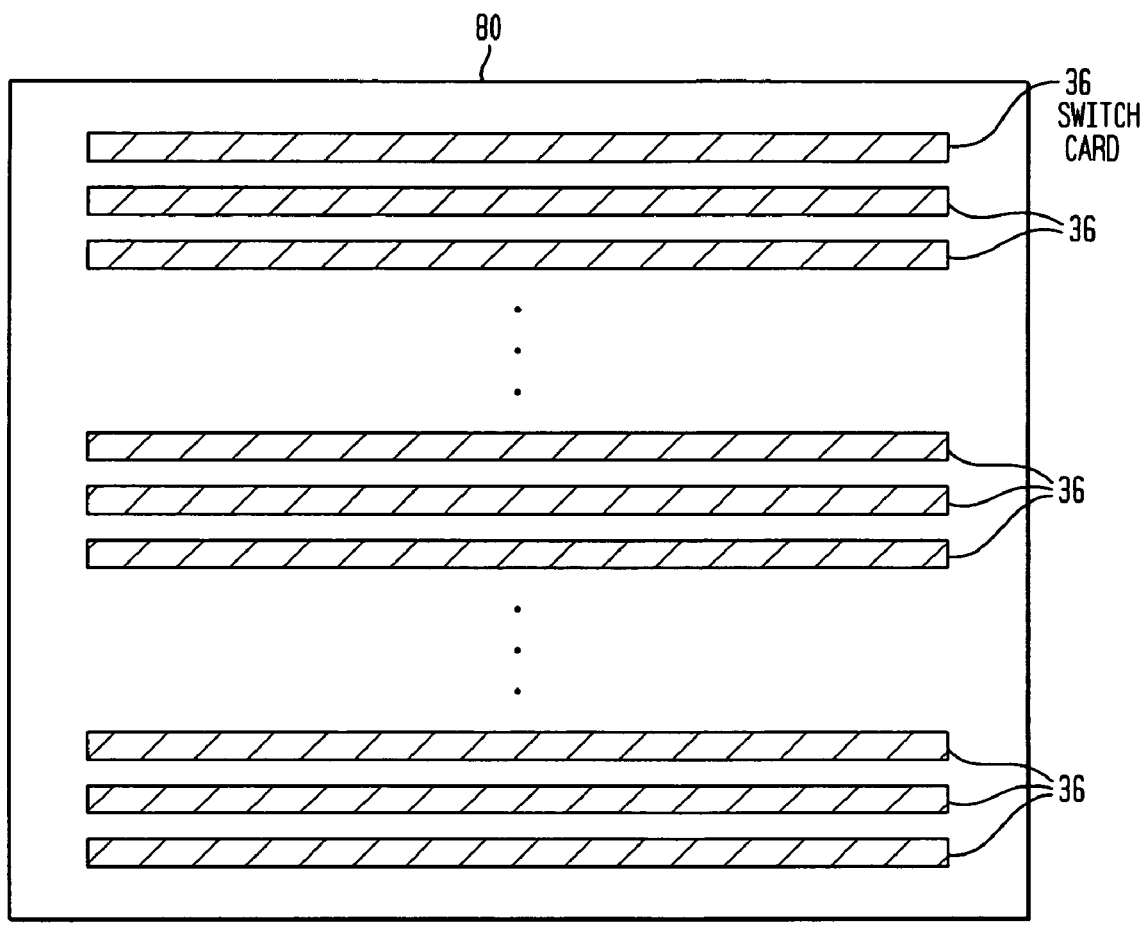
FIGS. 8 through 11 illustrate an alternative construction of the same 65,536 computing node system.

FIG. 8 illustrates a switch mid-plane 80, populated by 16 switch cards 36. There is no interconnect across these switch cards. Each switch card 36 has 16 switch chips 34, leading to a total of 256 switch chips on a switch mid-plane.

Figure 9:
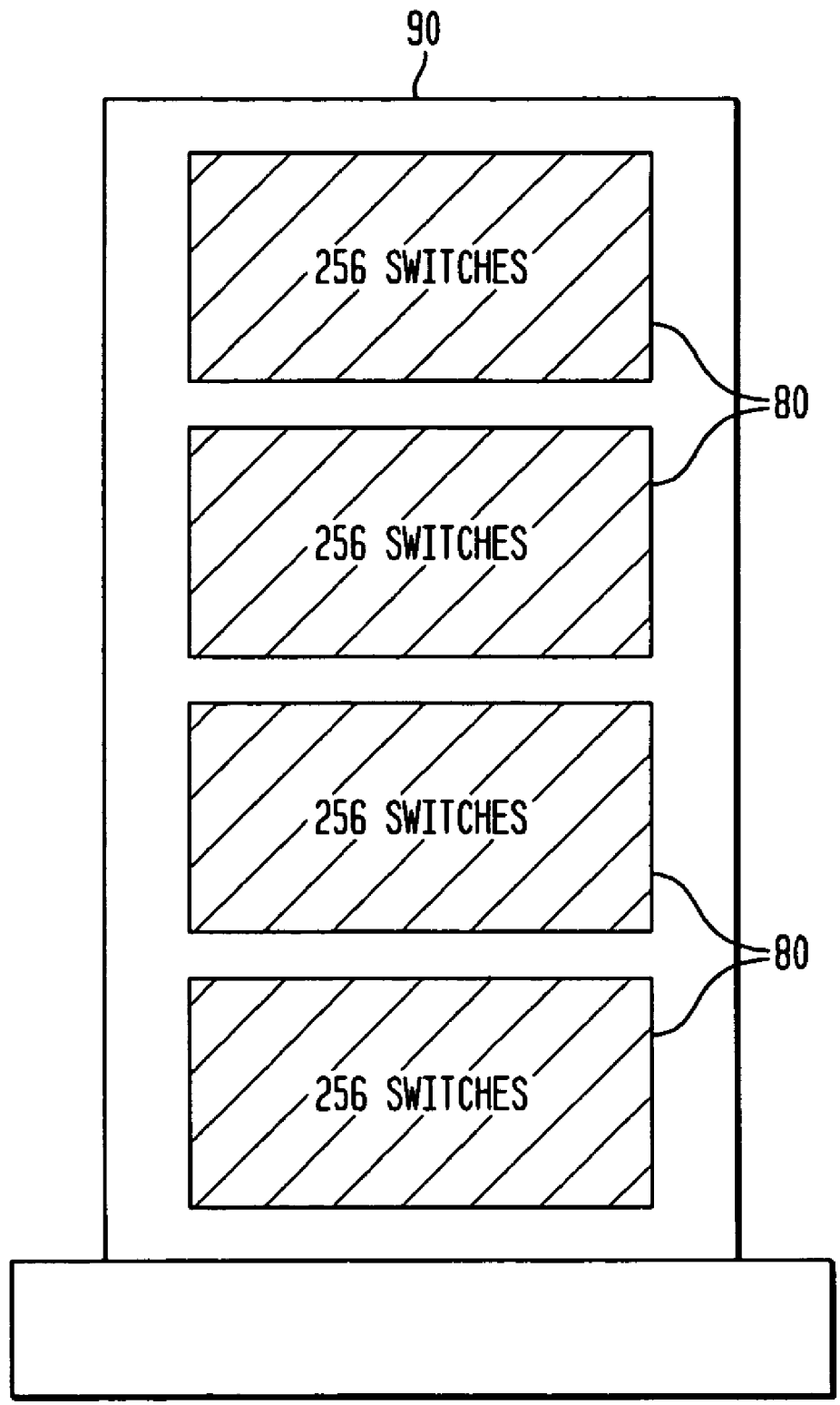

FIG. 9 illustrates a switch rack 90 having 4 switch mid-planes 80 for a total of 1024 switch chips in a rack.

Figure 10:
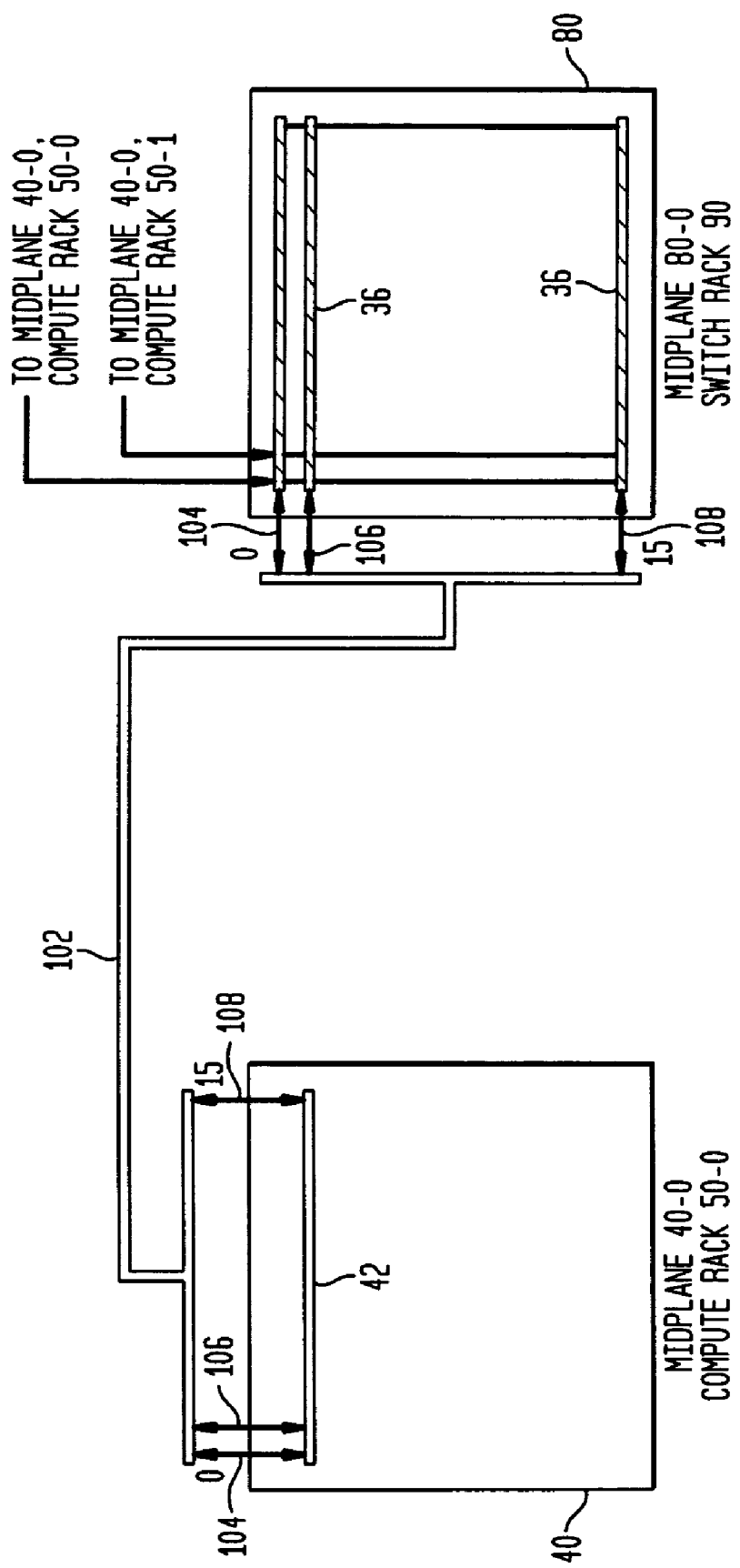

FIG. 10 illustrates the cabling in this embodiment. The optional z- and t-dimension switch cards 36Z, 36T in FIG. 4 are not populated in this embodiment. Instead, the same total number of switch cards are put into separate switch racks 90. The logically identical cabling illustrated in FIG. 6 also applies here, except that all the switch cards are now in switch racks 90. FIG. 10 shows such connections. As an example, the I/O driver 42 on mid-plane 0 of compute rack 50-0 has 256 z-dimension ports in a bundle 102 to be connected to 256 different switch chips 34 in mid-plane 0 of switch rack 0. The bundle of interconnects 102 is further divided into 16 smaller bundles, 104, 106, 108, etc, each has 16 interconnects to be connected to a switch card. The t-dimensional cables are connected similarly through switch racks in the t-dimension.

Figure 11:
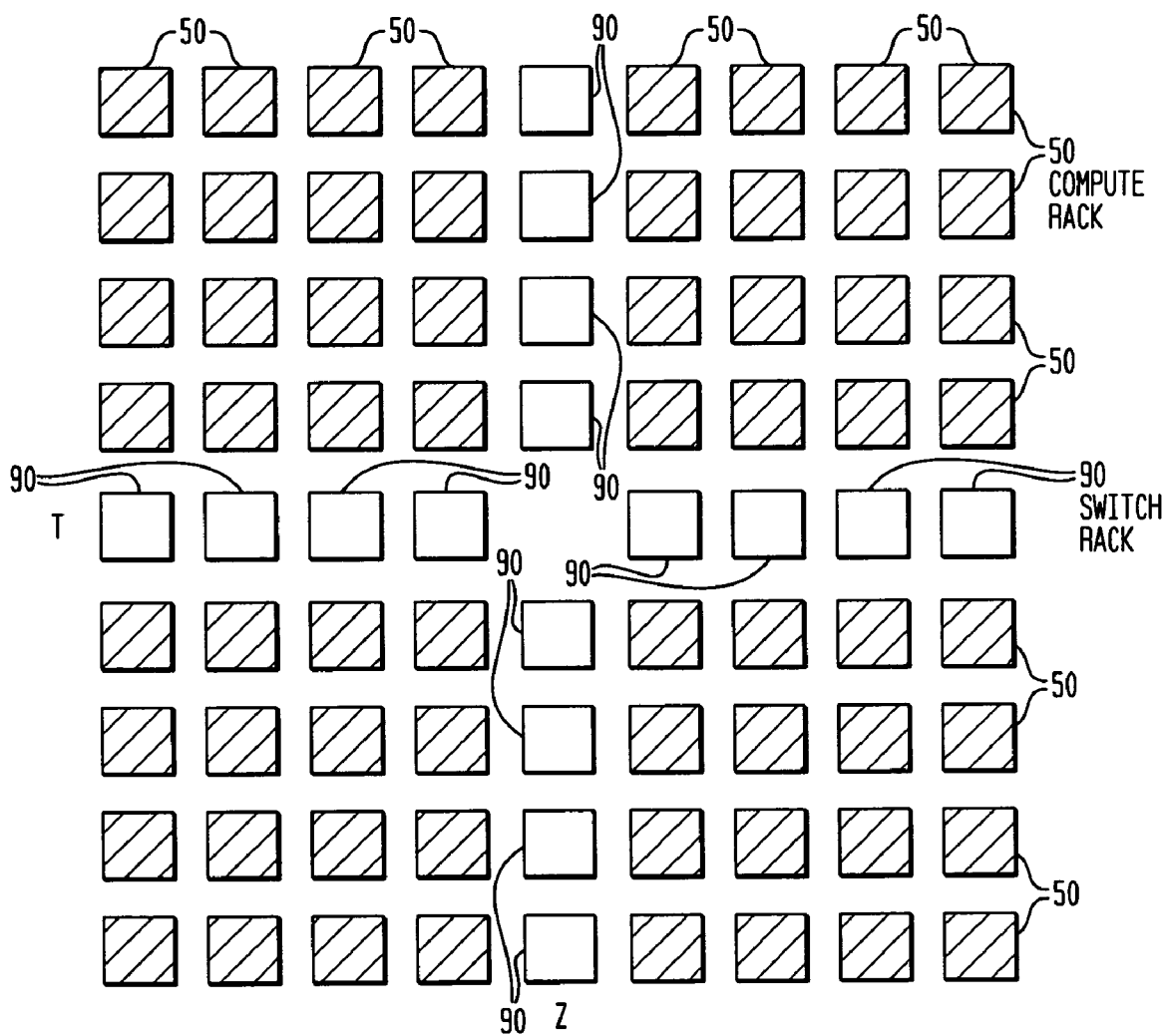

FIG. 11 illustrates the 64K node system 70 consisting of 64 compute racks 50 and 16 switch racks 90, 8 switch racks for the z-dimension and the other 8 switch racks for the t-dimension.

The above alternatives in z- and t-dimensions for connecting a node and switch apply to any dimension. In another alternative embodiment, a node could connect to its switches via 4 cables directly out of the compute node card 30, whereas all of the x-, y-, z-, t-dimension switches are on separate switch cards 36. In this case, the compute and switch mid-planes 40, 80 will be common which only supply power and other relative low speed signals to the compute and switch cards. The high speed ports for the 4-D network are connected directly between compute node cards and switch cards, leading to a more modular design. For example, a blade system is described in section 8.

4. Partitioning and Fault Tolerance

As is typical for a multi-node parallel computer, the multidimensional switch network allows the computer to be partitioned. Thus multiple applications can execute simultaneously, each application in its own partition. The multidimensional switch can be partitioned into any hypercubes (or rectangular shapes) of nodes from 1 node up to the full machine. Each node only sees cut-through traffic from its own partition. Each switch can be partitioned because it is a full cross-bar. Therefore all network traffic is contained within its partition. There is no cross network traffic among different partitions and thus no interference between applications. In other words, an application and its performance is unaffected by activities in other partitions.

Because each 1-D switch is a full crossbar configuration, every node on a 1-D switch has equal network distance to any other nodes on the same switch. Therefore, a partition can allow each dimension of a partition to use any subset of nodes on a switch in that dimension. There is no need to use nodes attached to physically consecutive ports on the switch. Expanding to a multidimensional switch, a partition can be any slices of cubes (or rectangular shape) across the multidimensional switch.

The partitionability is further described below. In a cube, each dimension is a contiguous range of indices. However, all nodes on a switch are equidistant. So there is no need for a contiguous range of indices. Instead, each partition can have any set of indices in each dimension. In other words, the cube can be sliced in each dimension and the slices can be moved apart. Call this sliced-cube partitioning.

The partitioning allows the node indexing at the application level to be a 0-based contiguous cube. And within each dimension, the mapping from application level node index to physical node index as given by the switch port number can be permuted.

Figure 12:
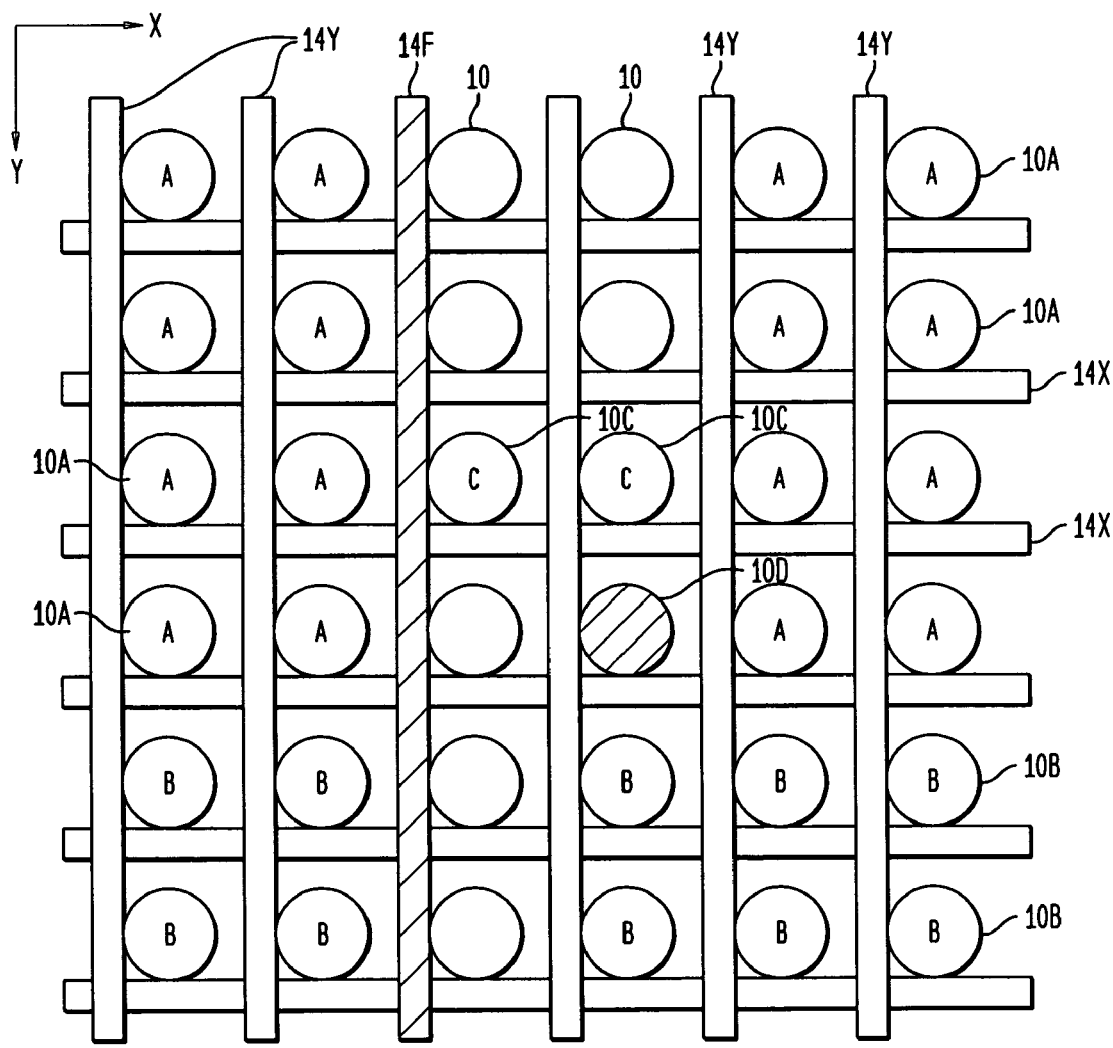
FIG. 12 illustrates the partitionability and fault tolerance of the multi-dimensional switch network.

FIG. 12 illustrates an exemplary partitioning of a 36-node computer based on a 6*6 switch network. The nodes' x-index is 0 to 5, left to right. The nodes' y-index is 0 to 5, top to bottom. Three partitions are illustrated in FIG. 12. Partition A consists of the 4*4 nodes 10A marked A. The nodes of this sliced-cube partition A have indices x=0,1,4 or 5 and y=0,1,2 or 3. Partition B consists of the 2*5 nodes 10B marked B. The nodes of this sliced-cube partition B have indices x=0,1,3,4 or 5 and y=4 or 5. Partition C consists of the 2*1 nodes 10C marked C. The nodes of this sliced-cube partition C have indices x=2 or 3 and y=2. Partitioning on switches of other dimension sizes is a straightforward extension. For example on a 4D switch with 16 nodes in each dimension, the following is a valid 2*4*1*2 sliced-cube partition: x=9,13; y=1,3, 5,7; z=7; t=14,15.

Node hardware can make application use of the sliced cube easier and/or transparent. For example, an application is always in terms of 0-based contiguous cube. The node hardware has a table for each dimension to translate from the 0-based cube of the application to the sliced-cube of the partition. In a related issue, by permuting the table entries, the application can be mapped differently onto the hardware. Such remapping is typically done to help determine if a problem of unknown origin is due to a particular node or switch hardware or is due to the application code.

Partitioning typically allows fault tolerance. The sliced-cube partitioning described above allows a partition to not include faulty nodes. For example, FIG. 12 illustrates a faulty node 10D not included in any of the 3 partitions A, B or C used by applications. Furthermore, the sliced cube partitioning allows a partition to not include a faulty switch. For example, FIG. 12 illustrates a faulty switch 14F not included in any of the 3 partitions A, B or C used by applications. For partitions smaller than the entire machine, the multidimensional switch network thus is fault tolerant towards faulty nodes and faulty switches.

5. Collective Communication on the Multidimensional Switch Network

The other sections of this disclosure implicitly describe the multidimensional switch support for point-to-point communication. Such communication has a single sending node and a single receiving node. This section describes the multidimensional switch support for collective communication. Such communication has one or more sending nodes and one or more receiving nodes. Collective communication can be constructed from point-to-point communication by software on the nodes. However, collective communication is typically faster and more efficient if supported in network hardware. Such hardware support by the multidimensional switch is described below.

Figure 13:
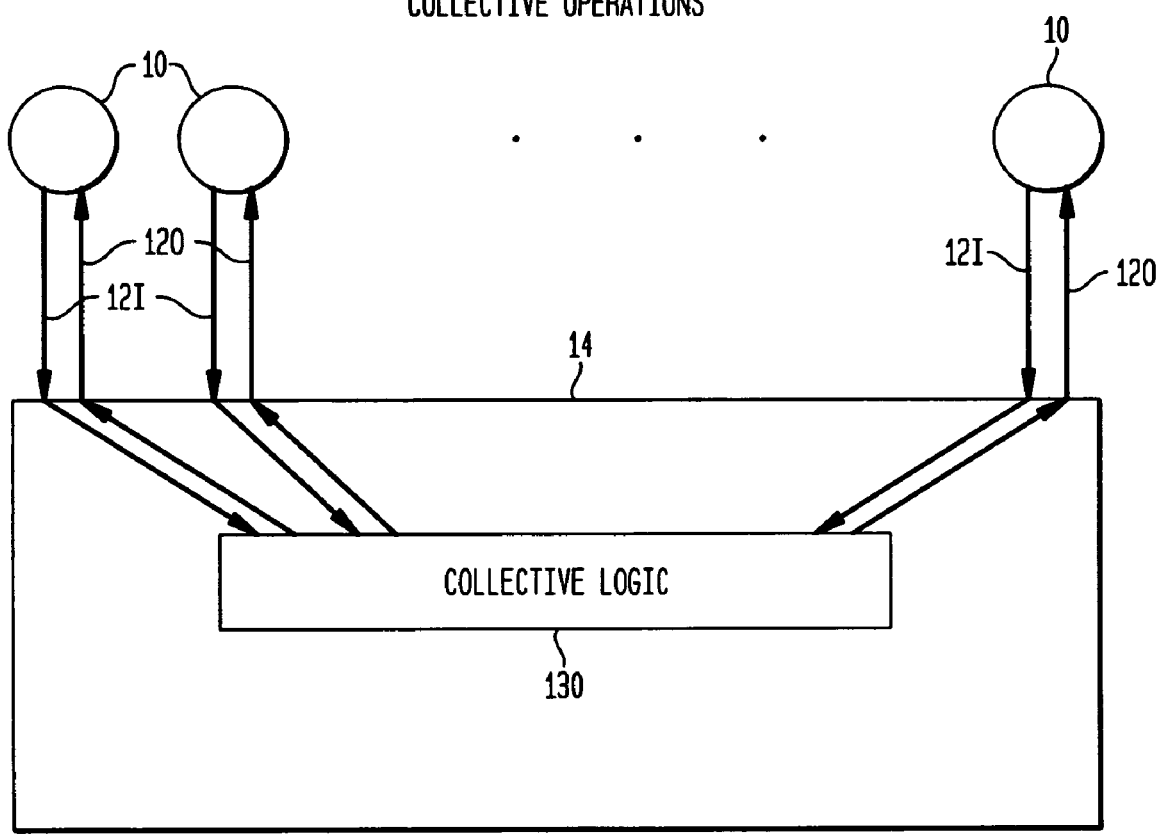
FIG. 13 illustrates an implementation of collective operations over the multi-dimensional switch network.

In a multicast communication, a single node sends packets to be received by multiple nodes. For example, a broadcast communication is a multicast to all nodes in a partition. Multicast communication is supported by a multidimensional switch network in which nodes and switches can forward an incoming packet to multiple outgoing ports. This is illustrated for the switch 14 in FIG. 13. An incoming packet from one of the nodes 10 on one of the incoming ports/links 12I into the switch 14 is forwarded by the combine/collective logic unit 130 on multiple outgoing ports 12O to multiple nodes 10. In existing network hardware, such forwarding to multiple ports is typically done by including a class value in the multicast packet. The node or switch uses the class value as an index to a preprogrammed table whose entries identify the outgoing ports.

In a reduction communication, multiple nodes each send a packet. The contents of the packets are combined by arithmetic operations into a single resulting packet. Typical operations include integer addition, finding the maximum operand, as well as the bitwise logical operators AND, OR and XOR. Typically the original packets and the intermediate result packets are pairwise combined in stages. Typically a class value in the packet is used to lookup in a preprogrammed table which other incoming ports are participating in the reduction. A reduction communication on the multidimensional switch network can be implemented as follows. First each node sends its packet to its X-switch, which arithmetically reduces the contributed packets to a single result packet. The switch forwards this intermediate result packet back to all contributing nodes. This is illustrated for the switch 14 in FIG. 13. The incoming packets from one or more participating nodes 10 on the incoming links 12I into the switch 14 are combined by the collective logic unit 130 and the result is forwarded on the outgoing ports 12O to the participating nodes 10. Each node forwards this X-independent result to its Y-switch. The y-switch performs the same actions as described for the x-switch above. The resulting packet received by each node from the y-switch is X- and Y-independent. This result is the final reduction result in a 2D switch network since it contains the contributions of all nodes in both dimensions. In networks of higher dimension, the procedure can be repeated over each remaining switch dimension one at a time, and every node eventually receives the final reduction result. The procedure described here has a desirable low latency; the low total number of hops is just the number of switch dimensions. By the standard technique of pipelining, the procedure also has a desirable high bandwidth equal to the bandwidth of 1 link between a switch and a node. The above example actually is a reduction with broadcast. A reduction without broadcast is similar. At each stage, instead of broadcasting the results, the results are sent to a single node.

The typical reduction operators mentioned above are commutative, for example A|B|C=A|C|B, and associative, for example (A|B)|C=A|(B|C). Hence the final result of such reduction operators is unique, independent of the particular reduction order in the pairwise combination in stages. By allowing the preprogrammed class tables to specify the exact reduction order, the multidimensional switch can provide a unique final result for reduction operators that are not associative or commutative. For example, due to rounding dependent on the operand values, floating point addition is not always associative or commutative. The exact reduction order specifies the dimension order on the nodes. In the above example, the X-reduction is followed by the Y-reduction. The exact reduction order also specifies the reduction order in the collective logic unit 130 across the incoming ports 12I in each switch 14 illustrated in FIG. 13.

6. Features of the 4-D Switch and Application Mapping

The following discussion compares the characteristics and advantages of a 4-D switch network pursuant to the present invention against prior art message-passing multistage fat tree switch networks and against multidimensional torus or mesh networks.

The usual multistage fat-tree switch network is essentially a 1-dimensional switch network, in other words, a full crossbar switch. Assume that the bandwidth of each network port is of unit 1 for both type of networks. The multistage fat-tree switch network would have only one port connecting between a compute node and a switch port, with lots of cross connection internal to the switch among different stages. Comparing the 4-D switch network to the usual multistage fat-tree switch network and assuming the same total number of network ports for nodes and switches over the whole system, then the 4-D switch network has the following advantages: (1) All to all bandwidth at 1 is the same as the fat-tree switch. (2) Neighbor bandwidth for the 4-D switch network is 4, compared to 1 of the fat-tree switch. (3) Each switch chip of the 4-D switch network has only one half of the total number of ports of a corresponding 4-stage fat-tree switch, which is much easier to design and costs less.

Figure 14:
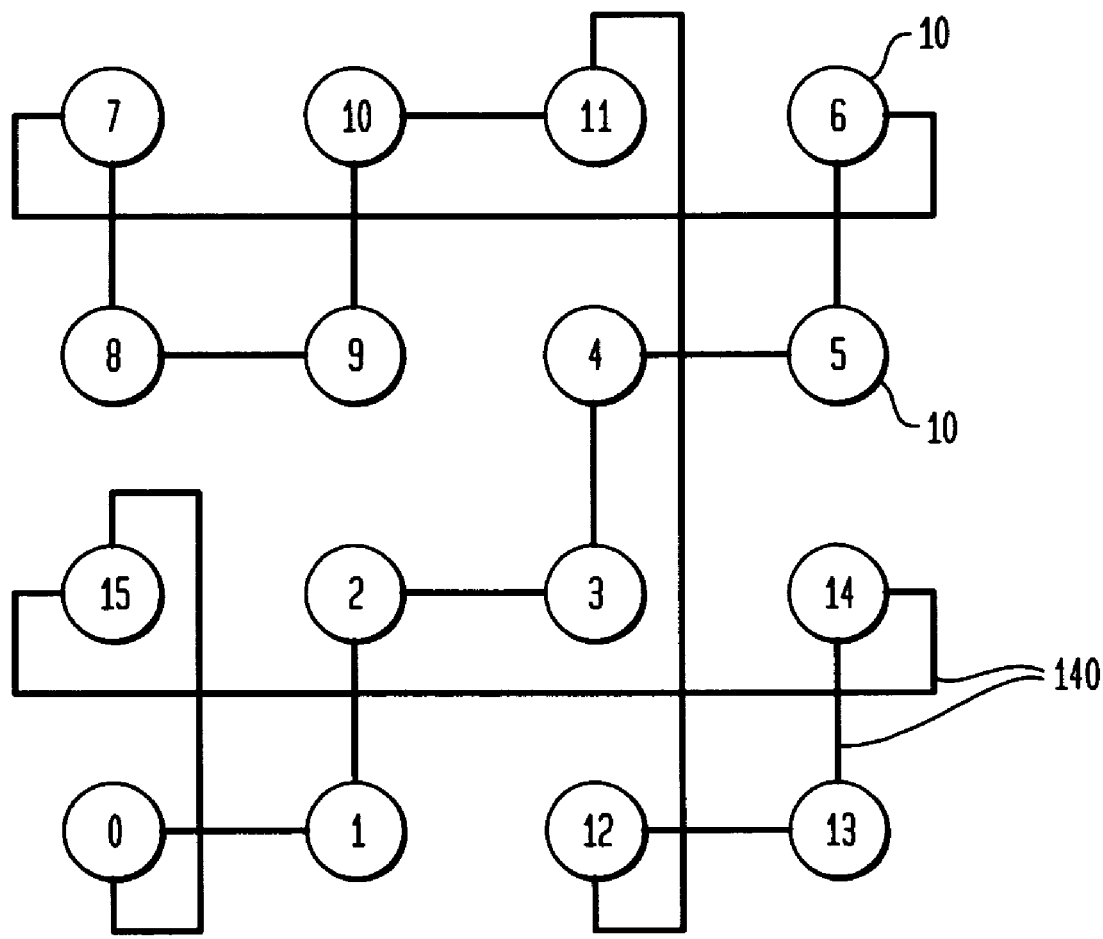
FIG. 14 illustrates an optimal application mapping of a 2-D machine into a linear array of 1-dimensional nodes.

As an example, FIG. 14 illustrates an optimal mapping of a (4×4) 2-D network onto a linear 1-dimensional array of nodes. In FIG. 14, 10 indicates compute nodes 0-15, whereas 140 indicates the links, which comprise all interconnect including cables and switch chips, connecting these compute nodes. Each compute node is labeled with an index from 0 through 15. For a compute node with an index I, it has 2 network connections, one to I−1, one to I+1, therefore the nearest neighbor bandwidth is 2 (assume per port bandwidth of 1) instead of 1 that one get from a 1-d multistage fat-tree switch. In a similar example, for applications mapped onto 2-D arrays of nodes, the 4-D switch network provides a nearest neighbor bandwidth of 4 compared to 1 from the fat-tree switch.

Compare a 65,536 node 4-D switch network to a 65,536 (32×32×64) node 3-D torus, and assume per port bandwidth=1. One skilled in the art would derive the bandwidth for each type of applications as follows:

|  | 3-D torus | 4-D switch |
|---|---|---|
| All-to-all bandwidth: | ⅛ | 1 |
| Nearest Neighbor bandwidth: |  |  |
| 4-D app | 6 | 4 |
| 3-D app | 6 | 3 |
| 2-D app | 4 | 4 |

The nearest neighbor bandwidth for most problem decomposition is comparable between the two type of networks, while the 4-D switch network is 8 times better in terms of bandwidth in all-to-all communications. Also, the 4-D switch network better allows more equal sized node dimensions, especially for 4-D and 2-D applications, which in turn improves applications' performance and scalability.

7. Machines of Various Size:

The multidimensional switch network offers very good scalability from very small machines all the way up to a very large full 65,536 (64K) node machine, or larger in terms of the number N of dimensions or the number of nodes. In other words, switches and nodes as described in this disclosure are well-suited for constructing various sizes of multi-node computers. Obviously, 1 to 16 nodes can be connected with a single X-switch 14X. 16 to 256 nodes can be connected with both X and Y switches 14X, 14Y in a 2-D configuration. A 3-D configuration can have up to 16×16×16=4096 nodes. Finally, the full machine in the 4-D can vary from 4096 to 65536 nodes in increments of 4096 nodes.

Some examples of more sophisticated constructions of smaller machines follow. A 5-node computer can be constructed without switch chips. Since each node has 4 ports, it can directly connect to the other 4 nodes. A 16*2-node computer can be constructed using 32 nodes and 2 switch chips. The long dimension of depth 16 makes standard use of the switch chips. The short dimension of depth 2 uses no switch chips, instead the 2 nodes are directly connected. Similarly, a 16*3-node computer and a 16*4-node computer can be constructed.

An alternative 16*4-node computer can be constructed using 64 nodes and 8 switch chips. Four switch chips serve the dimension of depth 16 in the usual fashion. The other 4 switch chips each serve as 4 independent 4-port switches for the dimension of depth 4. Similarly, a 16*8-node computer can be constructed using 4 switch chips serving as 2 independent 8-port switches. Such a division of a switch is similar to the partitioning described elsewhere.

In the switch network, the switches need not know the dimensionality of the system. Instead only the nodes know the dimensionality of the system. This allows the switches to be used in machines of various size and of various performance characteristics. For example, four 16-port switches can connect 16 nodes with 4 times the usual link bandwidth. For example, for a 5D 16*16*16*16*16 node system, only the nodes differ from the nodes of a 4D 16*16*16*16 machine. The exact same 16-port switch can be used.

In an exemplary implementation of such a switch, in a packet sent by a node to a switch, a fixed position in the header specifies the output switch port. Sending node creates a switch header which envelopes the node header and payload. The switch header can be thrown away by the receiving node or the switch send port. Of course, some fields could be shared between the node header and the switch header: packet size, class number for collectives, priority, etc.

The multidimensional switch network also is otherwise well-suited to construct a multi-node computer. For example, computers are often constructed as blade systems. In such a system, compute and other chips are mounted on a blade, which is a circuit card with common external characteristics for size and for connections to power, control and external networks. This allows a blade to plug into any blade-compatible rack.

A node card can be constructed with all connections to switches via cables mounted at the front of the card. Thus none of the connections for the switch network are via the back of the node card onto the mid-plane. The back of the node card connects to power, control and perhaps external networks. Hence a node card can be a blade.

Similarly, a switch card can be constructed with all connections to nodes via cables mounted at the front of the card. Thus none of the connections for the switch network are via the back of the switch card onto the mid-plane. The back of the switch card connects to power, control and perhaps external networks. Hence a switch card can be a blade. Since the computer consists of node cards and switch cards, the computer is suitable for blade construction.

8. Other Uses for the Multidimensional Switch Network

The applicability of the multidimensional switch extends beyond the multi-node parallel computer described herein. As described, the switch network requires routing functionality from each of the nodes in the network. The switch leaves open other features of each node. For example, in a multi-node parallel computer, the nodes need not be identical. The nodes can have different amounts of memory or have different computer processors. Some nodes could have disk drives or other input/output (I/O) such as Ethernet connectivity to the world outside the multi-node computer. Some of the nodes might not have a computer processor and instead have sensors or actuators interacting with the physical world.

Generalizing further, the multidimensional switch network has uses outside a multi-node parallel computer. For example, the switch network could serve as a many-ported router for Ethernet or other general-purpose networking. Such a router forwards an incoming packet on a port to the desired outgoing port. The outgoing port is determined using an address-to-port table in the router and the address contained within the packet. As such a router, nodes of the switch network have Ethernet connections and route packets through the switch. Each node has a local copy of the routing table in order to identify the outbound node and port of each incoming packet. The switch network's collective communication abilities are well-suited to broadcast to all nodes changes in the routing table.

While several embodiments and variations of the present invention for a multidimensional switch network are described in detail herein, it should be apparent that the disclosure and teachings of the present invention will suggest many alternative designs to those skilled in the art.

The invention claimed is:

1. A method of connecting a number of parallel nodes together in a multidimensional switch data network, comprising:

providing a multidimensional switch data network of nodes having N dimensions, and a number/array of nodes Ln in each of the N dimensions, wherein Ln can be the same or different for each of the N dimensions, wherein a node has no links to any of its neighboring nodes;

providing each node with an N port routing element having a bidirectional port for each of the N dimensions;

connecting each node of an array of Ln nodes in each of the N dimensions through a port of its routing element to an Ln port crossbar switch having Ln ports, one port for each of the Ln nodes in that dimension; and, passing data over the network from a source node to a destination node over a minimal path, wherein indices of the source node and the destination node differ in one or more dimensions designated as being non-satisfied dimensions, and indices in other dimensions are the same and are designated as being satisfied dimensions, including forwarding the data from the source node to one of its source node crossbar switches in a non-satisfied dimension, which then forwards the data to an intermediate node satisfying that dimension, which then forwards the data to one of the intermediate node crossbar switches in a remaining non-satisfied dimension, and this forwarding across a switch and a node is repeated until the data reaches the destination node and all dimensions are satisfied.

* * * * *